US008686684B2

(12) United States Patent
Turner et al.

(10) Patent No.: US 8,686,684 B2
(45) Date of Patent: Apr. 1, 2014

(54) MAGNETIC INDUCTIVE CHARGING WITH LOW FAR FIELDS

(75) Inventors: Jim Turner, Monroe, WA (US); Scott Saponas, Seattle, WA (US); Desney Tan, Kirkland, WA (US); Dan Morris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 12/413,217

(22) Filed: Mar. 27, 2009

(65) Prior Publication Data

US 2010/0244767 A1  Sep. 30, 2010

(51) Int. Cl.
*H02J 7/00* (2006.01)

(52) U.S. Cl.
USPC ............ 320/108; 320/114; 320/115; 320/127

(58) Field of Classification Search
USPC .......................................... 320/108
See application file for complete search history.

(56) References Cited

U.S. PATENT DOCUMENTS

| 5,519,262 | A | 5/1996 | Wood | |
|---|---|---|---|---|
| 5,617,477 | A | 4/1997 | Boyden | |
| 6,809,498 | B2 * | 10/2004 | Nakamura et al. | 320/108 |
| 6,825,618 | B2 | 11/2004 | Pu et al. | |
| 6,906,495 | B2 * | 6/2005 | Cheng et al. | 320/108 |
| 7,211,986 | B1 | 5/2007 | Flowerdew et al. | |
| 7,248,017 | B2 | 7/2007 | Cheng et al. | |
| 8,228,025 | B2 * | 7/2012 | Ho et al. | 320/108 |
| 2006/0145660 | A1 | 7/2006 | Black et al. | |
| 2007/0145830 | A1 * | 6/2007 | Lee et al. | 307/135 |
| 2007/0279002 | A1 | 12/2007 | Partovi | |
| 2009/0121675 | A1 * | 5/2009 | Ho et al. | 320/108 |
| 2009/0230777 | A1 * | 9/2009 | Baarman et al. | 307/104 |
| 2009/0284227 | A1 * | 11/2009 | Mohammadian et al. | 320/137 |

FOREIGN PATENT DOCUMENTS

| JP | 2002199598 A | 7/2002 |
|---|---|---|
| KR | 1020050016879 A | 2/2005 |
| KR | 100734676 B1 | 7/2007 |
| WO | 2008137996 A1 | 11/2008 |

OTHER PUBLICATIONS

"International Search Report", Mailed Date: Oct. 20, 2010, Application No. PCT/US2010/028044, Filed Date: Mar. 19, 2010, pp. 9.

(Continued)

*Primary Examiner* — Edward Tso
*Assistant Examiner* — Johali Torres Ruiz
(74) *Attorney, Agent, or Firm* — Dan Choi; Carole Boelitz; Micky Minhas (57) ABSTRACT

A charging station wirelessly transmits power to mobile electronic devices (MEDs) each having a planar-shaped receiver coil (RC) and a capacitor connected in parallel across the RC. The station includes a planar charging surface, a number of series-interconnected bank A source coils (SCs), a number of series-interconnected bank B SCs, and electronics for energizing the SCs. Each SC generates a flux field perpendicular to the charging surface. The bank A and bank B SCs are interleaved and alternately energized in a repeating duty cycle. The coils in each bank are also alternately wound in a different direction so that the fields cancel each other out in a far-field environment. Whenever an MED is placed in close proximity to the charging surface, the fields wirelessly induce power in the RC. The MEDs can have any two-dimensional orientation with respect to the charging surface.

14 Claims, 3 Drawing Sheets

(56) References Cited

OTHER PUBLICATIONS

"Evanescent Coupling?!? A New Way to Transfer Electrical Energy?", Retrieved at << http://www.electro-tech-online.com/general-electronics-chat/25359-evanescent-coupling-new-way-transfer-electrical-energy.html >>, Date: Jun. 11, 2007, pp. 6.

Frye, et al., "Investigation of Mutual Inductive Coupling in RF Stacked-Die Assemblies", Retrieved at << http://ieeexplore.ieee.org/stamp/stamp.jsp?arnumber=04550133 >>, Electronic Components and Technology Conference, May 27-30, 2008, pp. 6.

"Wireless Power Supply", Retrieved at <<http://students.chem.tue.nl/ifp21/WirelessPowerFinalReport.pdf >>, pp. 33.

"iPhone / iTablet Dock—Inductive Charging", Retrieved at << http://hrmpf.com/wordpress/113/iphone-itablet-dock-inductive-charging >>, Date Feb. 15, 2007, pp. 13.

Tesla, Nikola, "Witricity", Retrieved at << http://www.witricitynet.com/>>, Retrieved Date: Feb. 2, 2009, pp. 7.

"Wildcharge", Retrieved at << http://www.wildcharge.com/>>, Retrieved Date: Feb. 2, 2009, pp. 1.

"Cut Loose", Retrieved at << http://www.splashpower.com >>, Retrieved Date: Feb. 2, 2009, pp. 1.

"eCoupled", Retrieved at << http://www.ecoupled.com/>>, Retrieved Date: Feb. 2, 2009, pp. 4.

Jian, et al., "A Novel Wireless Charging System for Movable Telephone with Printed-Circuit-Board Windings of Different Structure and Shape Respectively", Retrieved at << http://ieeexplore.ieee.org/stamp/stamp.jsp?arnumber=4412331&isnumber=4411938 >>, Proceeding of International conference on Electrical Machines and Systems, ICEMS, International Conference, Date: Oct. 8-11, 2007, pp. 1283-1285.

Hui, et al., "A New Generation of Universal Contactless Battery Charging Platform for Portable Consumer Electronic Equipment", Retrieved at << http://ieeexplore.ieee.org/stamp/stamp.jsp?arnumber=01355823 >>, 35th Annual IEEE Power Electronics Specialists Conference, vol. 01, Date: Jun. 20-25, 2004, pp. 638-644.

Lim, et al., "Low-Profile Contactless Battery Charger Using Planar Printed Circuit Board Windings as Energy Transfer Device", Retrieved at << http://ieeexplore.ieee.org/stamp/stamp.jsp?arnumber=01022515 >>, 33rd Annual IEEE Power Electronics Specialists Conference, vol. 02, 2002, pp. 579-584.

Liu, et al., "Optimal Design of a Hybrid Winding Structure for Planar Contactless Battery Charging Platform", Retrieved at << http://ieeexplore.ieee.org/stamp/stamp.jsp?arnumber=04407205 >>, IEEE Transactions on power electronics, vol. 23, Date: Jan. 2008, pp. 455-463.

\* cited by examiner

FIG. 3

MAGNETIC INDUCTIVE CHARGING WITH LOW FAR FIELDS

BACKGROUND

Mobile electronic devices (MEDs) continue to increase in popularity and new types of MEDs are becoming commercially available all the time. Additionally, each new generation of MEDs continues to get smaller and more compact. An MED typically includes one or more batteries that store electrical power which is used to operate the MED, where the batteries require periodic replacement or periodic electrical charging. One common method for charging the batteries in an MED is to plug the MED into an electrical power outlet using a wired charging adapter cable. Another common method for charging the batteries in an MED is to remove the batteries from the MED and physically place them into a battery charging device. In both of these methods electrical power is transmitted to the batteries via wired conduction. A less common method for charging the batteries in a MED, but one which is becoming increasingly popular, is to wirelessly couple the MED to a charging station which employs electromagnetic induction to wirelessly transmit electrical power to the batteries.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Magnetic inductive charging (MIC) framework embodiments described herein generally involve wirelessly transmitting electrical power to mobile electronic devices (MEDs). In one exemplary embodiment a charging station is provided which wirelessly transmits electrical power to the MEDs. The charging station includes a planar charging surface, an even number of series-interconnected bank A source coils, an even number of series-interconnected bank B source coils, and source electronics for energizing the bank A and bank B source coils. Each source coil generates an alternating electromagnetic flux field in a direction perpendicular to the charging surface. The bank A and bank B source coils are alternately energized in a repeating duty cycle. In addition, each bank of source coils is alternately wound in a different direction so that the flux fields cancel each other out in a far-field environment. Whenever one or more MEDs each having a receiver coil are placed in close proximity to the charging surface, one or more of the flux fields wirelessly induce electrical power in the receiver coil. The bank A source coils and bank B source coils are interleaved so that the MEDs can have any two-dimensional orientation with respect to the charging surface.

In another exemplary embodiment a power receiver is provided which wirelessly receives electrical power from the charging station. The power receiver includes a receiver coil having a planar shape, and a capacitor connected in parallel across the receiver coil. The capacitor serves to resonate the receiver coil. Whenever the power receiver is placed in close proximity to the planar charging surface of the charging station, one or more of the flux fields generated by the charging station wirelessly induce electrical power in the receiver coil.

DESCRIPTION OF THE DRAWINGS

The specific features, aspects, and advantages of the magnetic inductive charging (MIC) framework embodiments described herein will become better understood with regard to the following description, appended claims, and accompanying drawings where:

DETAILED DESCRIPTION

In the following description of magnetic inductive charging (MIC) framework embodiments reference is made to the accompanying drawings which form a part hereof, and in which are shown, by way of illustration, specific embodiments in which the MIC framework can be practiced. It is understood that other embodiments can be utilized and structural changes can be made without departing from the scope of the MIC framework embodiments.

The term "power" is used herein to refer to electrical power. The term "mobile electronic device (MED)" is used herein to refer to a wide variety of different types of electronic devices which are portable such as cellular telephones, MP3 (Moving Picture Experts Group-1 Audio Layer-3) music players, video game controllers, cameras, PDAs (personal digital assistants), notebook/laptop computers, toys, wearable devices such as health monitoring sensors, and the like. The term "near-field environment" is used herein to refer to physical locations within an electromagnetic field generated by an electronic device which are in close proximity to (i.e., near) the device. Correspondingly, the term "far-field environment" is used herein to refer to physical locations within the electromagnetic field generated by an electronic device which are not in close proximity to (i.e., far from) the device. In the context of the MIC framework embodiments described hereafter, the near-field environment can be considered to be physical locations within a radius of 1.5 cm from a charging station, and the far-field environment can be considered to be physical locations outside of a radius of 2.9 m from the charging station.

1.0 Magnetic Inductive Charging (MIC) with Low Far Fields

Figure 1:
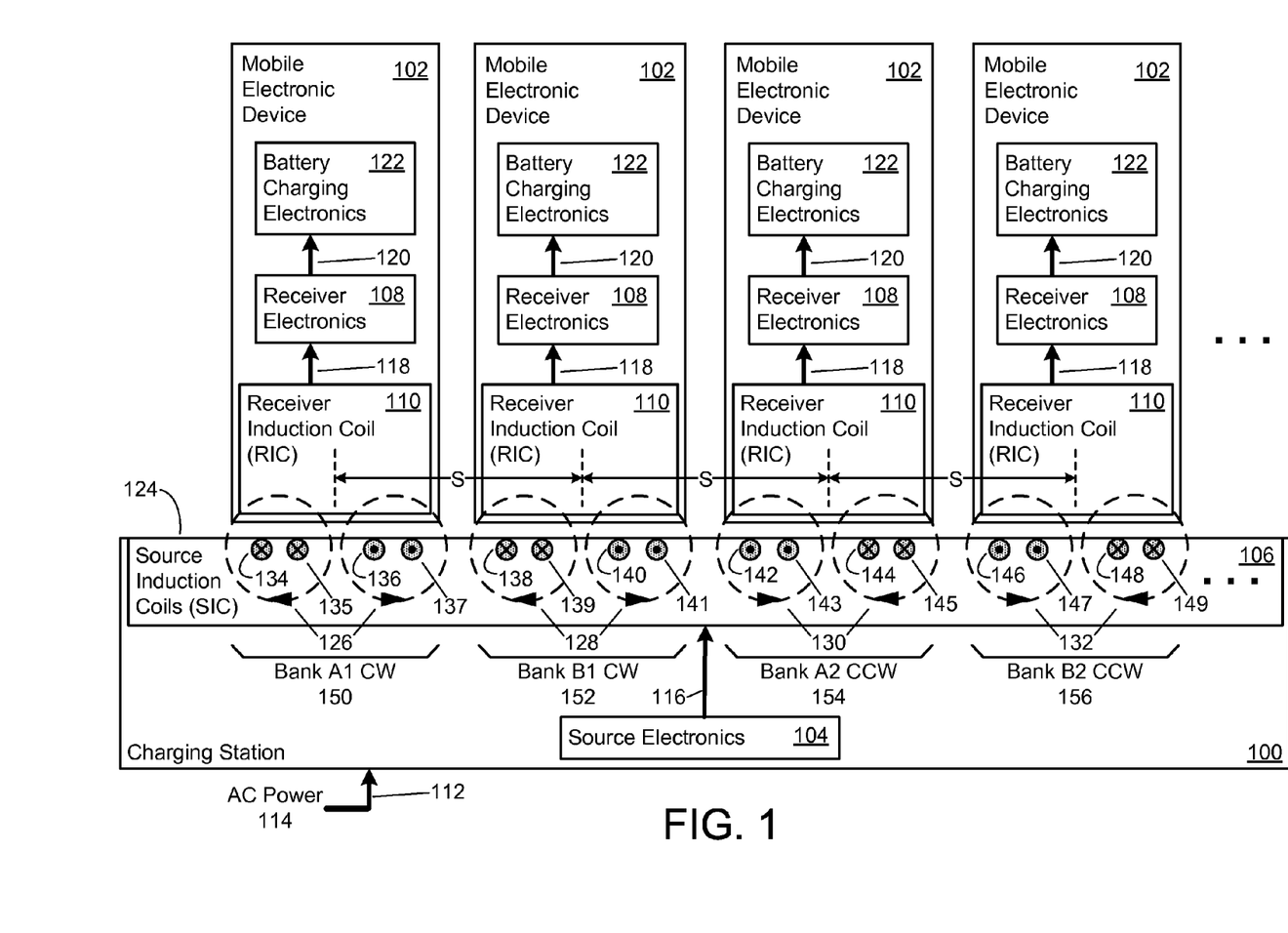
FIG. 1 is a diagram illustrating an exemplary embodiment, in simplified form, of the MIC framework which includes one or more mobile electronic devices (MEDs) and a charging station.

FIG. 1 illustrates an exemplary embodiment of the MIC framework. Generally speaking and as exemplified in FIG. 1, the MIC framework includes one or more MEDs 102 and a charging station 100 which is electrically connected 112 to an alternating current (AC) power source 114. The charging station 100 includes a planar charging surface 124, a source electronics module 104, and a source induction coils (SIC) module 106 having a plurality of source coils 150/152/154/156. As will be described in more detail hereafter, each source coil 150/152/154/156 has a planar shape and the source coils are uniformly distributed along the planar charging surface 124 using a prescribed center-to-center spacing S between adjacent source coils. The source electronics module 104 processes the AC power 114, and the processed power is transferred 116 to the SIC module 106 such that the source coils 150/152/154/156 generate a plurality of alternating electromagnetic flux fields 126/128/130/132 in a direction which is perpendicular to the charging surface 124.

Referring again to FIG. 1, each MED 102 includes a receiver induction coil (RIC) module 110 having a receiver coil (not shown but described in more detail hereafter), a receiver electronics module 108 and a battery charging electronics module 122. The receiver coil has a planar shape. Whenever one or more MEDs 102 are physically placed either directly upon or very near the charging surface 124 (both conditions hereafter simply referred to as being "in close proximity to the charging surface"), one or more of the alternating electromagnetic flux fields 126/128/130/132 generated by the source coils 150/152/154/156 will wirelessly induce power in each receiver coil. In other words, when one or more receiver coils are physically placed in close proximity to the charging surface 124 each receiver coil electromagnetically couples to one or more of the source coils 150/152/154/156 to form an electrical transformer which serves to wirelessly transmit power from the source coils to each receiver coil.

Referring again to FIG. 1, power which has been wirelessly induced in the RIC module's 110 receiver coil (hereafter simply referred to as "induced power") is transferred 118 to the receiver electronics module 108. The receiver electronics module 108 converts the induced power into regulated direct current (DC) power which is then transferred 120 to the battery charging electronics module 122. The battery charging electronics module 122 serves to charge (i.e., store the DC power in) one or more electrical batteries (not shown) in the MED 102. Thus, the induced power can either be immediately used to operate the MED 102, or it can be stored in the MED's batteries for future use. It is noted that a plurality of MEDs 102 can be wirelessly charged at the same time by a common charging station 100.

Generally speaking and as appreciated in the art of electromagnetic induction, the efficiency of the aforementioned mutual electromagnetic induction between the receiver coil and one or more of the source coils is based on a variety of factors such as the distance there-between, the strength of the alternating electromagnetic flux fields generated by the source coils, the frequency of these flux fields, and the amount of mutual inductance between the receiver coil and source coils. As the distance between the receiver coil and source coils is decreased, their mutual inductance will generally decrease and the mutual electromagnetic induction therebetween will increase, thus increasing the amount of power which is wirelessly transmitted to the MED. As the frequency of the flux fields generated by the source coils is increased and as the amount of current flowing through the source coils is increased, the strength of the flux fields is increased and the amount of power which is wirelessly transmitted to the MED is further increased. Practically speaking however, the allowable strength of the flux fields is limited by various governmental rules and regulations such as those imposed by the Federal Communications Commission (FCC) and other similar regulatory agencies.

The MIC framework embodiments described herein are advantageous for a variety of reasons including, but not limited to, the following. Users can electrically charge their MEDs in a graceful, scalable and simple manner since they do not have to find a specific wired charging adapter cable and plug this cable into both the MED and an AC power outlet. The possibility of electrocution of a user while they are charging their MED is greatly reduced because there are no exposed electrical conductors on either the MED or the charging station, and because there is no wired conduction between the MED and the charging station. The possibility of electrocution of a user is also reduced because the user does not have to remove the batteries from the MED and physically place them into a battery charging device.

The MIC framework embodiments described herein are also advantageous for the following additional reasons. As will be appreciated from the more detailed description of the MIC framework embodiments that follows, the source electronics module, SIC module, RIC module, receiver electronics module and battery charging electronics module can be inexpensively manufactured using conventional, off-the-shelf components and conventional printed circuit board (PCB) materials. The PCB costs are further reduced because no special ground planes or removal of ground planes are required in any of the PCBs. The PCB area that is interior to the receiver coil may be used for other circuits. As will also be appreciated from the more detailed description that follows, each MED and the receiver coil included therein can have any two-dimensional planar orientation with respect to the charging surface. Since the strength of the alternating electromagnetic flux field generated by each source coil is maximized in the near-field environment as described hereafter, a larger separation is allowed between the receiver coil and source coils. This can make the charging station and MED easier and less costly to manufacture.

Referring again to FIG. 1, a more detailed description of the source electronics module 104 and SIC module 106 in the charging station 100, and the RIC module 110 and receiver electronics module 108 in each MED 102 will now be provided.

1.1 Source Electronics Module and Source Induction Coils (SIC) Module

Figure 2:
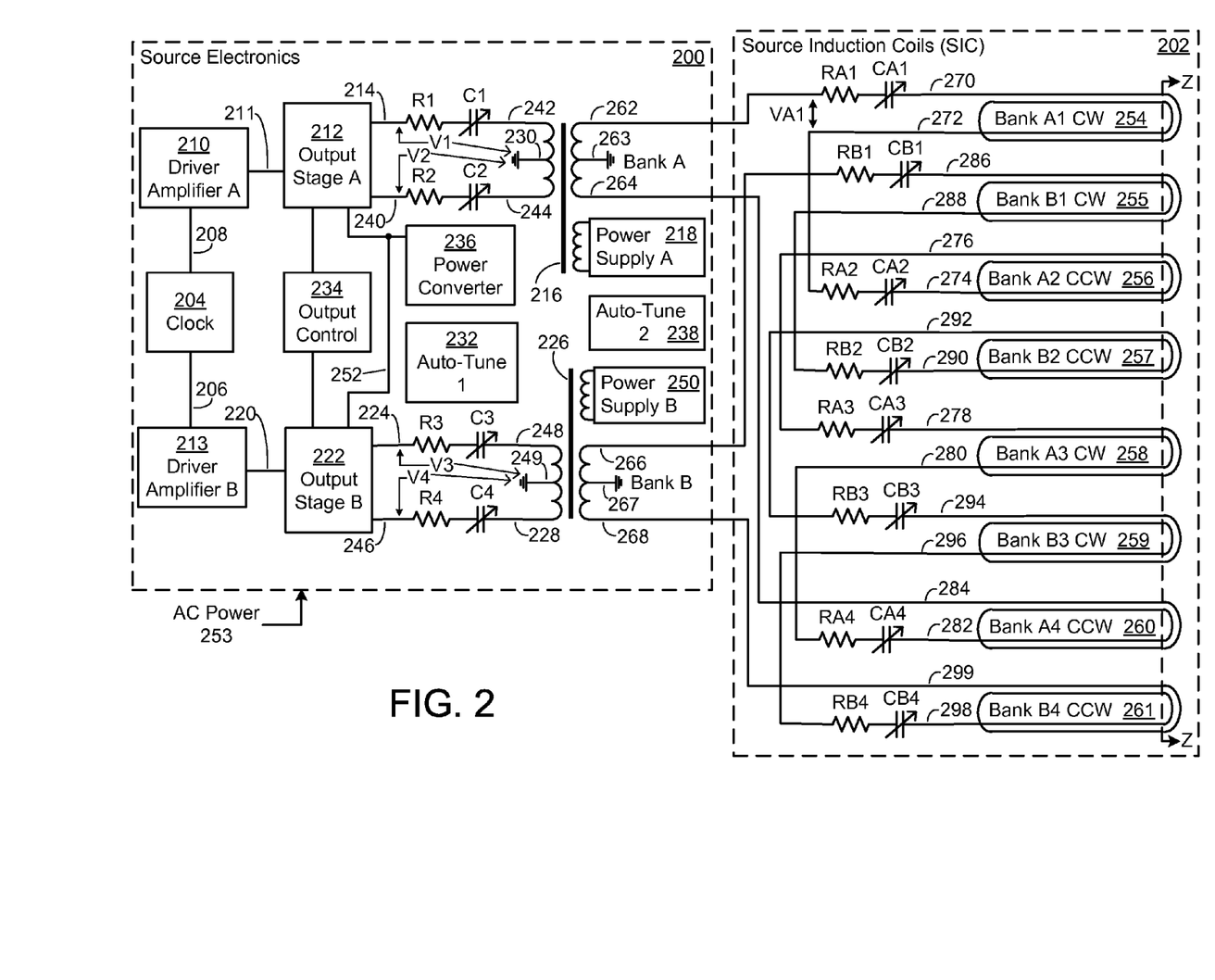
FIG. 2 is a diagram illustrating an exemplary embodiment, in simplified form, of a source electronics module and source induction coils module which are included in the charging station.

FIG. 2 illustrates an exemplary embodiment of the aforementioned source electronics module and SIC module in the charging station. As exemplified in FIG. 2 and referring again to FIG. 1, the source electronics module 200 includes the following elements. A clock circuit 204 outputs a pair of crystal-stabilized AC clock signals 206 and 208 which, as will be appreciated from the description provided hereafter, provide a prescribed steady, high frequency for the alternating electromagnetic flux fields 126/128/130/132 generated by the SIC module 106/202.

Referring again to FIGS. 1 and 2, while the actual frequency employed in the clock circuit 204 is somewhat arbitrary, there are several things to consider when selecting an optimal frequency. Generally speaking and by way of example but not limitation, using a high frequency in the clock circuit 204, and parallel resonating a receiver coil (not shown but described in more detail hereafter) which is included in the RIC module 110, results in a large voltage swing (i.e., a large peak-to-peak voltage) being induced in a receiver coil having as few as two turns (i.e., loops) when the RIC module is physically placed in close proximity to the SIC module 106/202. As is appreciated in the art of resonant RLC (resistor/inductor/capacitor) electronics, the receiver coil generally operates as an inductor. At lower frequencies the impedance of the receiver coil is low resulting in a smaller voltage swing being induced in the receiver coil when the RIC module 110 is placed in close proximity to the SIC module 106/202; this is generally undesirable. At higher frequencies, the impedance of the receiver coil is larger and the induced voltage is greater, thus resulting in a larger voltage swing being induced in the receiver coil when the RIC module 110 is placed in close proximity to the SIC module 106/202; this is generally desirable. However, it is noted that if the frequency becomes too large, a "skin effect" and eddy current losses can start to develop in the SIC module's 106/202 and RIC module's 110 PCB traces, which will reduce the efficiency of the electromagnetic coupling between the SIC module and the RIC module, which is undesirable. In an exemplary embodiment of the MIC framework a high frequency of 13.56 MHz is employed in the clock circuit 204. 13.56 MHz is advantageous since the FCC and other similar regulatory agencies allow electronic devices to emit stronger electromagnetic fields in the far-field environment at this particular frequency.

Referring again to FIG. 2, the first clock signal 208 output by the clock circuit 204 is connected to a first driver amplifier circuit 210 which amplifies the first clock signal and increases its voltage and current drive levels to a first prescribed voltage and current. The first driver amplifier circuit 210 outputs a first amplified clock signal 211 which is connected to a first output stage circuit 212. The first output stage circuit 212 further increases the voltage and current drive levels for the first amplified clock signal 211 and outputs a first pair of secondarily amplified clock signals 214 and 240 which are connected to a primary winding on a first transformer 216 in the following manner. A secondarily amplified clock signal A 214 is connected to one side 242 of the primary winding on the first transformer 216 through a series RC (resistor and capacitor) circuit R1/C1. A secondarily amplified clock signal B 240 is connected to the other side 244 of the primary winding on the first transformer 216 through another series RC circuit R2/C2. A center tap 230 on the primary winding on the first transformer 216 is connected to circuit ground.

Referring again to FIG. 2, the second clock signal 206 output by the clock circuit 204 is connected to a second driver amplifier circuit 213 which amplifies the second clock signal and increases its voltage and current drive levels to the aforementioned first prescribed voltage and current. The second driver amplifier circuit 213 outputs a second amplified clock signal 220 which is connected to a second output stage circuit 222. The second output stage circuit 222 further increases the voltage and current drive levels for the second amplified clock signal 220 and outputs a second pair of secondarily amplified clock signals 224 and 246 which are connected to a primary winding on a second transformer 226 in the following manner. A secondarily amplified clock signal C 224 is connected to one side 248 of the primary winding on the second transformer 226 through yet another series RC circuit R3/C3. A secondarily amplified clock signal D 246 is connected to the other side 228 of the primary winding on the second transformer 226 through yet another series RC circuit R4/C4. A center tap 249 on the primary winding on the second transformer 226 is connected to circuit ground.

Referring again to FIG. 2, an output control circuit 234 is connected to both the first output stage circuit 212 and second output stage circuit 222. The output control circuit 234 monitors the current flowing through the SIC bank A coils 254/256/258/260 and dynamically adjusts the first output stage circuit 212 as necessary to regulate this current such that it is maintained at a prescribed constant level. Similarly, the output control circuit 234 monitors the current flowing through the SIC bank B coils 255/257/259/261 and dynamically adjusts the second output stage circuit 222 as necessary to regulate this current such that it is maintained at the prescribed constant level.

Referring again to FIG. 2, C1-C4 have a low power loss and a capacitance value which can be dynamically varied. In other words, C1-C4 are made up partly of a prescribed fixed-value capacitance and partly of capacitances that are dynamically switched in or out under microprocessor control by a first auto-tune circuit 232 as follows. The first auto-tune circuit 232 senses a voltage V1 from an input side 214 of R1 to circuit ground, and a current I1 flowing through R1, and dynamically adjusts the capacitance value of C1 to maintain a near zero phase difference between V1 and I1. The first auto-tune circuit 232 also senses a voltage V2 from an input side 240 of R2 to circuit ground, and a current I2 flowing through R2, and dynamically adjusts the capacitance value of C2 to maintain a near zero phase difference between V2 and I2. The first auto-tune circuit 232 also senses a voltage V3 from an input side 224 of R3 to circuit ground, and a current flowing through R3, and dynamically adjusts the capacitance value of C3 to maintain a near zero phase difference between V3 and I3. The first auto-tune circuit 232 also senses a voltage V4 from an input side 246 of R4 to circuit ground, and a current flowing through R4, and dynamically adjusts the capacitance value of C4 to maintain a near zero phase difference between V4 and I4. Therefore, the first auto-tune circuit 232 serves to allow the first and second output stage circuits 212 and 222 to drive loads that are primarily resistive, thus reducing the level of power loss in the first and second output stage circuits.

Generally speaking and referring again to FIG. 2, the SIC module 202 includes a first prescribed even number of bank A source coils 254/256/258/260 which are connected in series to a first secondary winding on the first transformer 216, and a second prescribed even number of bank B source coils 255/257/259/261 which are connected in series to a first secondary winding on the second transformer 226. In an exemplary embodiment of the MIC framework described herein the first and second prescribed even numbers are the same. However, an alternate embodiment is also possible where the first and second prescribed even numbers are different. Each of the bank A source coils 254/256/258/260 and bank B source coils 255/257/259/261 is series-resonated by a dedicated series RC circuit. In the SIC module 202 exemplified in FIG. 2 four bank A source coils 254/256/258/260 and four bank B source coils 255/257/259/261 are employed. However, one alternate embodiment (not shown) of the SIC module 202 is possible which employs only two bank A source coils (e.g., 254/256) and two bank B source coils (e.g., 255/257). Another alternate embodiment (not shown) of the SIC module 202 is also possible which employs more than four (i.e., six, eight, etc.) bank A source coils and more than four (i.e., six, eight, etc.) bank B source coils. In the SIC module 202 exemplified in FIGS. 1 and 2 two turns (i.e., loops) are employed for each source coil 254-261. One alternate embodiment (not shown) of the SIC module 202 is possible which employs only one turn for each source coil 254-261. Another alternate embodiment (not shown) of the SIC module 202 is possible where, if the source coils 254-261 have a small areal size, more than two turns can be employed for each source coil.

Generally speaking and referring again to FIG. 2, the series-interconnected bank A source coils 254/256/258/260 are alternately wound in a different direction (i.e., the direction of the coil winding is alternately inverted). More particularly and as exemplified in FIG. 2, one side 262 of the first secondary winding on the first transformer 216 is connected to yet another series RC circuit RA1/CA1, which is then connected to the input side 270 of a bank A1 source coil that is wound in a clockwise (CW) manner 254. The output side 272 of the bank A1 CW source coil 254 is connected to yet another series RC circuit RA2/CA2, which is then connected to the input side 274 of a bank A2 source coil that is wound in a counter-clockwise (CCW) manner 256. The output side 276 of the bank A2 CCW source coil 256 is connected to yet another series RC circuit RA3/CA3, which is then connected to the input side 278 of a bank A3 source coil that is wound in a CW manner 258. The output side 280 of the bank A3 CW source coil 258 is connected to yet another series RC circuit RA4/CA4, which is then connected to the input side 282 of a bank A4 source coil that is wound in a CCW manner 260. Finally, the output side 284 of the bank A4 CCW source coil 260 is connected to the other side 264 of the first secondary winding on the first transformer 216. A center tap 263 on the first secondary winding on the first transformer 216 is connected to circuit ground.

Generally speaking and referring again to FIG. 2, the series-interconnected bank B source coils 255/257/259/261 are also alternately wound in a different direction. More particularly and as exemplified in FIG. 2, one side 266 of the first secondary winding on the second transformer 226 is connected to yet another series RC circuit RB1/CB1, which is then connected to the input side 286 of a bank B1 source coil that is wound in a CW manner 255. The output side 288 of the bank B1 CW source coil 255 is connected to yet another series RC circuit RB2/CB2, which is then connected to the input side 290 of a bank B2 source coil that is wound in a CCW manner 257. The output side 292 of the bank B2 CCW source coil 257 is connected to yet another series RC circuit RB3/CB3, which is then connected to the input side 294 of a bank B3 source coil that is wound in a CW manner 259. The output side 296 of the bank B3 CW source coil 259 is connected to yet another series RC circuit RB4/CB4, which is then connected to the input side 298 of a bank B4 source coil that is wound in a CCW manner 261. Finally, the output side 299 of the bank B4 CCW source coil 261 is connected to the other side 268 of the first secondary winding on the second transformer 226. A center tap 267 on the first secondary winding on the second transformer 226 is connected to circuit ground As described heretofore and referring again to FIGS. 1 and 2, each MED 102 and the receiver coil included therein can have any two-dimensional planar orientation with respect to the planar charging surface 124. As will be described in more detail hereafter, this is generally achieved by employing separate bank A and bank B source coils where the bank A coils and bank B coils are interleaved along the charging surface 124, and the bank A coils and bank B coils are alternately energized by the source electronics module 200 in a repeating duty cycle. The series-interconnected bank A source coils 254/256/258/260 and the series-interconnected bank B source coils 255/257/259/261 are interleaved along the charging surface 124 in the alternating manner exemplified in the SIC module 106 of FIG. 1. More particularly, FIG. 1 generally exemplifies a cross-sectional view of the bank A1 CW source coil 150/254, the bank B1 CW source coil 152/255, the bank A2 CCW source coil 154/256, and the bank B2 CCW source coil 156/257 taken along line Z-Z of FIG. 2. Figure elements 134 and 135 represent the PCB traces for the top two windings of the bank A1 CW source coil 150/254, and figure elements 136 and 137 represent the PCB traces for the bottom two windings of the bank A1 CW source coil. Figure elements 138 and 139 represent the PCB traces for the top two windings of the bank B1 CW source coil 152/255, and figure elements 140 and 141 represent the PCB traces for the bottom two windings of the bank B1 CW source coil. Figure elements 142 and 143 represent the PCB traces for the top two windings of the bank A2 CCW source coil 154/256, and figure elements 144 and 145 represent the PCB traces for the bottom two windings of the bank A2 CCW source coil. Figure elements 146 and 147 represent the PCB traces for the top two windings of the bank B2 CCW source coil 156/257, and figure elements 148 and 149 represent the PCB traces for the bottom two windings of the bank B2 CCW source coil. It is noted that if additional source coils are employed they would be physically interleaved along the charging surface 124 to the right of the bank B2 CCW source coil 156 in a similar alternating manner. In other words, the bank A3 CW coil 258 would be located immediately to the right of the bank B2 CCW source coil 156/257, followed by the bank B3 CW coil 259, followed by the bank A4 CCW coil 260, followed by the bank B4 CCW coil 261, and so on as desired.

Referring again to FIG. 2, the output control circuit 234 serves to operate the first output stage circuit 212 in a sequential, repeating duty cycle manner with the second output stage circuit 222 such that the first transformer 216 and the second transformer 226 are alternately energized in a repeating duty cycle. In an exemplary embodiment of the MIC framework described herein a 50 percent duty cycle is employed. However, alternate embodiments are also possible which employ other duty cycles. In other words, only one of the two transformers 216 and 226 is energized at any given point in time. Therefore, the bank A source coils 254/256/258/260 and the bank B source coils 255/257/259/261 are alternately energized in a repeating duty cycle (i.e., only the bank A coils or the bank B coils are energized at any given point in time). As a result, the alternating electromagnetic flux fields which are generated by the bank A source coils 254/256/258/260 and bank B source coils 255/257/259/261 do not interfere with each other in the near-field environment. Generally speaking, the period of this duty cycle can be varied and is generally set to a prescribed value which optimally charges the particular batteries employed in the MEDs. In an exemplary embodiment of the MIC framework described herein, a duty cycle period of one minute is employed.

For an MED which is physically placed in close proximity to the planar charging surface, the just described interleaving and alternating energization of the bank A and bank B source coils generally serve to maximize the power induced in the MED (and accordingly minimize the battery charging time for the MED) regardless of the MED's two-dimensional planar orientation with respect to the charging surface. More particularly, in one scenario where the center of the MED's receiver coil resides directly over the center of any one of the source coils (be it a bank A or bank B source coil), the receiver coil will optimally electromagnetically couple to the source coil. In this case, power will be induced in the receiver coil and the MED's batteries will be charged at a maximum rate. In another scenario where the center of the MED's receiver coil does not reside directly over the center of a source coil, but rather resides anywhere between the center of any one of the bank A source coils and the center of a bank B source coil which is adjacent to the bank A coil, the receiver coil will alternately electromagnetically couple to the bank A and bank B coils. In this case, power will be alternately induced in the receiver coil by both the bank A and bank B coils, and the MED's batteries will still be charged (although at a rate which is slightly less than the maximum rate).

Referring again to FIG. 1, each source coil 150/152/154/156 has a common planar shape and a common areal size. Additionally, a common center-to-center spacing S is employed between adjacent source coils. This common shape, size and spacing S are determined based on a variety of factors including, but not limited to, the areal size and planar shape of the receiver coil within each MED 102, and optimizing the electromagnetic induction between the source coils and the receiver coil when the MED is physically placed in close proximity to the charging surface 124. In an exemplary embodiment of the MIC framework described herein where the receiver coil's planar shape is rectangular and its areal size is 20 mm×16 mm, the center-to-center spacing S between adjacent source coils is 22 mm. Thus, even in the non-optimal scenario where a user places their MED 102 on the charging surface 124 such that half of the receiver coil resides over a bank A coil (e.g., bank A1 CW 150) and the other half of the receiver coil resides over a bank B coil (e.g., bank B1 CW 152), electromagnetic induction will alternately occur between the bank A coil and receiver coil, and then between the bank B coil and receiver coil.

Referring again to FIG. 2, series capacitors CA1-CA4 and CB1-CB4 have a low power loss and a capacitance value which can be dynamically varied. In other words, CA1-CA4 and CB1-CB4 are made up partly of a prescribed fixed-value capacitance and partly of capacitances that are dynamically switched in or out under microprocessor control by a second auto-tune circuit 238 as follows. The second auto-tune circuit 238 senses a voltage (e.g., VA1) across each source coil (e.g., bank A1 CW 254) and its associated dedicated series-resonating RC circuit (e.g., RA1 and CA1) and also senses the current flowing through the series resistor (e.g., RA1) in the RC circuit, and dynamically adjusts the capacitance value of the series capacitor (e.g., CA1) in the RC circuit to maintain a negligible phase difference between VA1 and this current. Therefore, the second auto-tune circuit 238 and the just described procedure for dynamically series-resonating each source coil 254-261 serve to keep the voltage in each source coil as low as possible so that a breakdown of the SIC module's 202 PCB dielectric material and related creepage current through the dielectric material do not occur. The second auto-tune circuit 238 and the just described procedure for dynamically series-resonating each source coil 254-261 thus also serve to keep the voltage across both the first and second transformers 216 and 226 as low as possible so that transformer saturation does not occur.

Referring again to FIGS. 1 and 2, the series resistor (e.g., RA1) for each source coil (e.g., bank A1 CW 150/254) serves to slightly reduce the "selectivity" and associated "quality factor" (Q) of the source coil so that whenever the charging station 100 is physically placed in close proximity to a conducting (e.g., metal) surface (which can change the effective inductance of the source coils 150/152/154/156), the source coils will not be significantly detuned. Additionally, any temporary inaccuracies in the auto-tune procedure which might exist will have a smaller effect on the current in the source coils 150/152/154/156 when the resonant frequency of the source coils is slightly different than the frequency of the clock signals 206 and 208. The resistance value for the dedicated series resistor (e.g., RA1) for each source coil (e.g., bank A1 CW 150/254) is selected to maximize the current flowing through the source coil and also slightly reduce the Q of the source coil as just described, thus further maximizing the strength of the alternating electromagnetic flux field (e.g., 126) generated by the source coil in the near-field environment.

Referring again to FIG. 1, although each of the alternating electromagnetic flux fields 126/128/130/132 are individually strong in the near-field environment, since the bank A source coils 150/154 are alternately wound in a different direction, the bank B source coils 152/156 are also alternately wound in a different direction, and the bank A coils and bank B coils are interleaved along the charging surface 124 as described heretofore, these flux fields cancel each other out in the far-field environment. In other words, since each source coil 150/152/154/156 has a relatively small areal size, and since the frequency of the flux field 126/128/130/132 generated by each source coil is high (e.g., the aforementioned 13.56 MHz), each source coil appears as a point source in the far-field environment. Since each pair of bank A source coils 150/154 in the series are separated by a relatively close distance 2S and are alternately wound in a different direction as described heretofore, the flux fields 126/130 generated by each pair of bank A source coils are 180 degrees out of phase with each other and hence cancel each other in the far-field environment. Similarly, since each pair of bank B source coils 152/156 in the series are also separated by a relatively close distance 2S and are also alternately wound in a different direction as described heretofore, the flux fields 128/132 generated by each pair of bank B source coils are also 180 degrees out of phase with each other and hence also cancel each other in the far-field environment. The net result of this far-field cancellation effect is that electromagnetic emissions generated by the charging station 100 in the far-field environment are significantly reduced to a low level despite the maximized strength of the individual flux fields 126/128/130/132 generated by the charging station in the near-field environment. This far-field cancellation effect is advantageous since regulatory agencies such as the FCC and the like impose strict, low level limits on the electromagnetic emissions permitted from electronic devices in the far-field environment.

Referring again to FIG. 2, a power converter circuit 236 converts the aforementioned AC power 253 into appropriate DC power which is supplied 252 to the first and second output stage circuits 212 and 222. The first transformer 216 and second transformer 226 serve to isolate the electronics in the source electronics module 200 having a circuit ground that is near the earth ground (not shown) of the AC power 253 from the SIC module 202 and the first auto-tune circuit 232. A first power supply circuit 218 is connected to a second secondary winding on the first transformer 216, and a second power supply circuit 250 is connected to a second secondary winding on the second transformer 226. The first and second power supply circuits 218 and 250 include a collection of conventional voltage rectifier devices and voltage regulator devices which serve to supply well regulated DC voltages as necessary to the various electronics in the source electronics module 200.

1.2 Receiver Induction Coil (RIC) Module and Receiver Electronics Module

Figure 3:
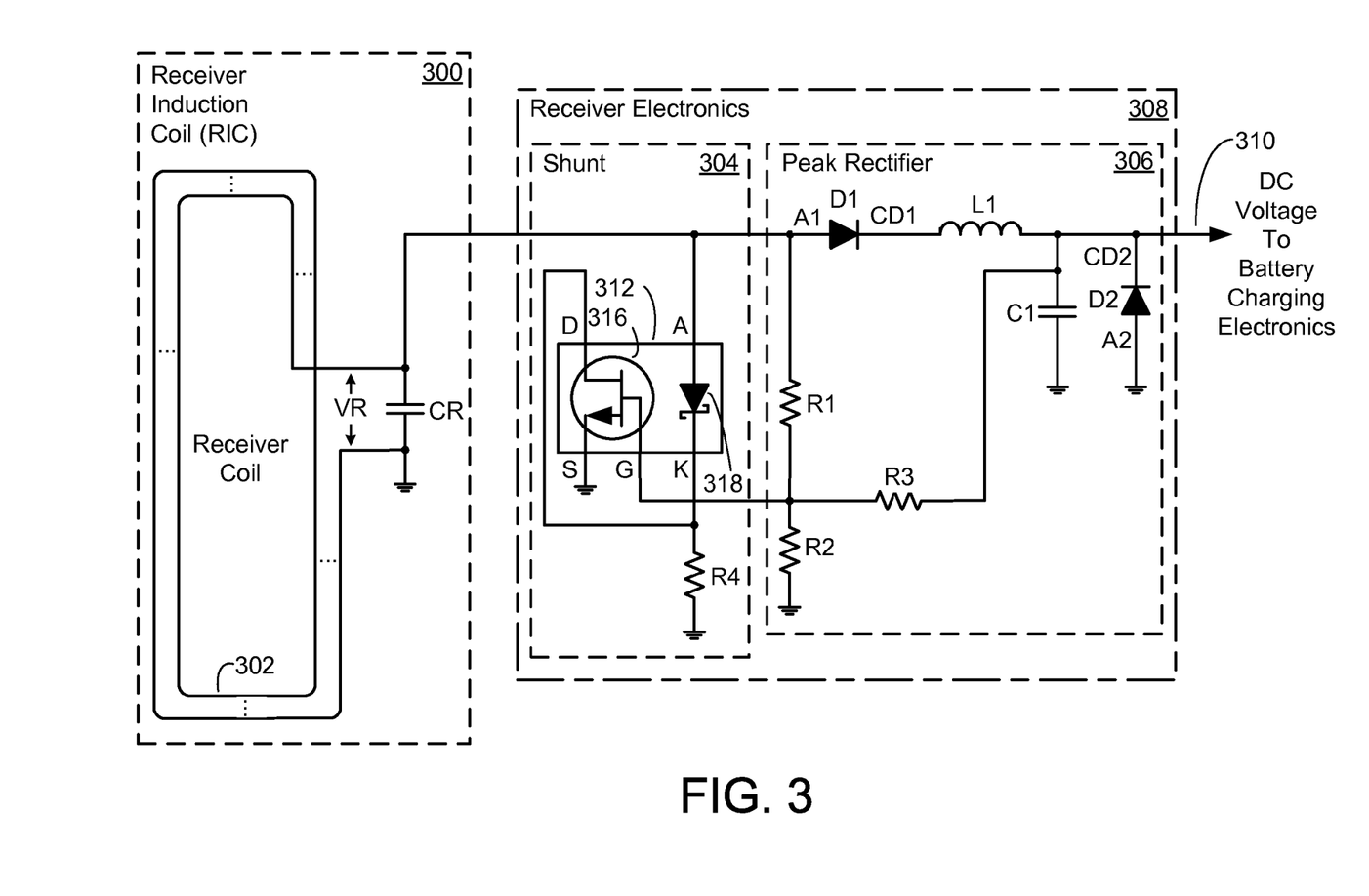
FIG. 3 is a schematic diagram illustrating an exemplary embodiment, in simplified form, of a receiver induction coil module and a receiver electronics module which are included in each MED.

FIG. 3 illustrates an exemplary embodiment of the aforementioned RIC module and receiver electronics module in each MED. As exemplified in FIG. 3 and referring again to FIG. 1, the RIC module 300 includes the aforementioned receiver coil 302 and a very low loss capacitor CR which is connected in parallel across the receiver coil, where the capacitor CR is used to resonate the receiver coil. One side of the receiver coil 302 and the capacitor CR are connected to circuit ground. The receiver coil 302 can have a small number of turns since a high frequency is employed for the alternating electromagnetic flux fields 126/128/130/132 generated by the source coils 150/152/154/156, and since the strength of each flux field in the near-field environment is maximized by maximizing the current flowing through each source coil.

Referring again to FIG. 3, each turn of the receiver coil 302 can be implemented as a series-interconnected collection of PCB traces which are routed along the perimeter of an inexpensive, flat PCB. Each turn can be implemented on a different layer of the PCB, where the turns on adjacent PCB layers are interconnected using a PCB via or equivalent means. It is noted that this same PCB can also include the circuitry for the RIC module 110/300, receiver electronics module 108/308 and battery charging electronics module 122. This implementation results in a receiver coil 302 which is very small and very "thin," and thus serves to minimize the mutual inductance with the source coils 150/152/154/156, and also serves to reduce the manufacturing cost. The manufacturing cost is further reduced since no high permeability materials are required in either the RIC module 110/300 or the receiver electronics module 108/308.

Referring again to FIGS. 1 and 3, when the receiver coil 302 is physically placed in close proximity to the charging surface 124, since the receiver coil has a small areal size and a small number of turns as described heretofore, the resonating voltage induced in the receiver coil will be small (e.g., approximately a few mV). However, since the receiver coil 302 is parallel resonated by the very low loss capacitor CR, the resonating current induced in the receiver coil will be large (e.g., approximately several hundred mA). This large resonating current creates an alternating voltage VR across capacitor CR having a peak-to-peak value which is large enough such that a simple, diode-based peak rectifier circuit 306 (which is described in more detail hereafter) can be used to convert VR into a regulated DC voltage 310.

Referring again to FIG. 3, the value of capacitor CR is selected to optimally resonate the receiver coil 302 based on the particular implementation employed for the receiver coil. In an exemplary embodiment of the RIC module 300 the receiver coil's 302 planar shape is rectangular, its areal size is 20 mm×16 mm, it has two turns, the width of the series-interconnected traces that make up the receiver coil is 1 mm, and capacitor CR has a value of 685 pF. Alternate embodiments of the receiver coil 302 are also possible which employ other planar shapes, other areal sizes, other numbers of turns and other trace widths. By way of example but not limitation, the receiver coil's 302 planar shape can be square, it can have either three or four turns, and the width of the series-interconnected traces that make up the coil can be as large as 2 mm. It is noted that employing more than four turns in the receiver coil can reduce the peak-to-peak value of the alternating voltage VR, which is undesirable.

Referring again to FIGS. 1 and 3, the alternating voltage VR across capacitor CR is connected to the receiver electronics module 108/308 which includes a shunt circuit 304 and a peak rectifier circuit 306. Since a user can place their MED 102 in any random position on the charging surface 124, the horizontal alignment between the receiver coil 302 and source coils 150/152/154/156 which are nearest the receiver coil can vary, as can the vertical separation there-between. As is appreciated in the art of electromagnetic induction, the strength of the alternating electromagnetic flux field 126/128/130/132 generated by each source coil 150/152/154/156 generally varies at $$\frac{1}{d^3}$$

in the near-field environment, where d is the distance from the center of the source coil. As such, the induced power in the receiver coil 302 can vary significantly, resulting in a significant and somewhat unpredictable variation in the peak-to-peak value of VR. As will be described in more detail hereafter, the shunt circuit 304 generally regulates changes in the peak-to-peak value of VR, and thus also serves to regulate the DC voltage 310 output from the peak rectifier circuit 306 such that the value of this DC voltage is maintained within a prescribed small voltage range. This regulation reduces any unexpected transient surges in VR and thus prevents such surges from damaging the other electronics in the MED 102.

Referring again to FIG. 3, the peak rectifier circuit 306 generally rectifies the alternating voltage VR across capacitor CR and outputs the DC voltage 310. Since the DC voltage 310 is maintained within a prescribed small voltage range by the shunt circuit 304 as described heretofore, it can be connected directly to a conventional, off-the-shelf, battery charging integrated circuit (IC) (not shown) without first having to process the DC voltage using interim DC-to-DC converter electronics. The battery charging IC then operates to charge one or more electrical batteries (not shown). The operation of the shunt circuit 304 and peak rectifier circuit 306 will now be described in more detail.

Referring again to FIG. 3, the shunt circuit 304 includes a series resistor R4 and an IC 312 having a N-channel MOSFET (metal oxide semiconductor field-effect transistor) 316 and a schottky diode 318. The alternating voltage VR is connected to the anode A of the schottky diode 318. The cathode K of the schottky diode is connected to the drain D of the MOSFET 316, and is also connected to circuit ground through series resistor R4. The source S of the MOSFET 316 is connected directly to circuit ground. In an exemplary embodiment of the shunt circuit 304 an ON Semiconductor NTLJF4156N device is employed for the IC 312 and resistor R4 has a value of 84.5 kΩ.

Referring again to FIG. 3, the peak rectifier circuit 306 includes three resistors R1/R2/R3, two diodes D1/D2, an inductor L1 and a capacitor C1. The anode A of the schottky diode 318 is also connected to a first side of resistor R1 and the anode A1 of diode D1. The gate G of the MOSFET 316 is connected to a second side of resistor R1, a first side of resistor R3, and a first side of resistor R2. The second side of R2 is connected to circuit ground. The cathode CD1 of diode D1 is connected to a first side of inductor L1. The second side of inductor L1 is connected to the second side of resistor R3, the positive side of C1 and the cathode CD2 of D2. This second side of L1 produces the aforementioned DC voltage 310. Both the negative side of C1 and the anode A2 of diode D2 are connected to circuit ground. In an exemplary embodiment of the peak rectifier circuit 306 resistor R1 has a value of 5.0 kΩ, resistor R2 has a value of 20.0 kΩ, resistor R3 has a value of 47.0 kΩ, inductor L1 has a value of 1.0 pH, capacitor C1 has a value of 0.1 pF, a Renesas Technology Corporation RKZ6.2KL device is employed for diode D2, and a Renesas Technology Corporation HSL278 device is employed for diode D1.

Referring again to FIGS. 1 and 3, whenever the peak-to-peak value of the alternating voltage VR across capacitor CR exceeds a prescribed large value, the MOSFET 316 turns on (i.e., a shunt current path is established from the MOSFET's drain D to its source S) which reduces the Q of the receiver coil 302. The schottky diode 318 serves to insure that the MOSFET 316 is turned on only half of the time that VR exceeds the prescribed large level. Resistor R1 which is connected between the anode A of the schottky diode 318 and the gate G of the MOSFET 316 serves to regulate changes in the peak-to-peak value of VR by allowing positive peaks in VR to quickly and briefly detune the receiver coil 302. In other words, R1 serves to move the resonance point of the receiver coil 302 away from the frequency of the alternating electromagnetic flux fields 126/128/130/132 which are generated by the source coils 150/152/154/156. Resistors R2 and R3, which are connected in series to the DC voltage 310 as described heretofore, divert a small amount of current from the battery charging electronics module and set a DC voltage point for the gate G of the MOSFET 316. Thus, resistors R2 and R3 provide another mechanism for controlling the MOSFET 316 conduction and therefore regulate the amount of current that flows from the drain D to the source S. It is noted that as the MOSFET 316 turns on and off the capacitance it presents to the RIC module 300 will change, which can also briefly detune the receiver coil 302. Resistors R2 and R3 serve to minimize this detuning effect by controlling the average capacitance that the MOSFET 316 presents to the RIC module 300.

Referring again to FIG. 3, the diode D1 rectifies the alternating voltage VR across capacitor CR. Inductor L1 isolates any load on the DC voltage 310 which is presented by the battery charging electronics module, and thus prevents this load from detuning the receiver coil 302. Inductor L1 also prevents diode switching transients from causing noise on the receiver coil 302 that would subsequently cause the receiver coil to generate unwanted electromagnetic emissions at higher frequencies.

2.0 Additional Embodiments

While the MIC framework has been described in more detail by specific reference to embodiments thereof, it is understood that variations and modifications thereof can be made without departing from the true spirit and scope of the MIC framework. It is also noted that any or all of the aforementioned embodiments can be used in any combination desired to form additional hybrid embodiments. Although the MIC framework embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

Wherefore, what is claimed is:

1. A charging station apparatus for wirelessly transmitting electrical power to mobile electronic devices (MEDs), comprising:
    a planar charging surface;
    a first prescribed even number of series-interconnected bank A source coils;
    a second prescribed even number of series-interconnected bank B source coils; and
    source electronics for energizing the bank A and bank B source coils, wherein,
        whenever energized, each source coil generates an alternating electromagnetic flux field in a direction perpendicular to the charging surface,
        the bank A source coils and bank B source coils are alternately energized in a repeating duty cycle, and
        the bank A source coils and bank B source coils are interleaved so that the MEDs can have any two-dimensional orientation with respect to the charging surface.

2. The apparatus of claim 1, wherein whenever one or more MEDs each comprising a receiver coil are placed in close proximity to the charging surface, one or more of the flux fields wirelessly induce electrical power in the receiver coil, and wherein each MED comprises one or more batteries and the duty cycle comprises a prescribed cycle period which is set to optimally charge the batteries.

3. The apparatus of claim 1, wherein,
    the source coils are uniformly distributed along the charging surface using a prescribed center-to-center spacing S between adjacent source coils,
    each source coil has a common planar shape and a common areal size, and
    the common planar shape and areal size of each source coil, and the spacing S are determined based on a planar shape and an areal size of the receiver coil.

4. The apparatus of claim 3, wherein,
    the planar shape of the receiver coil is rectangular,
    the areal size of the receiver coil is 20 mm×16 mm, and
    the center-to-center spacing S between adjacent source coils is 22 mm.

5. The apparatus of claim 1, wherein the flux field generated by each source coil has a frequency of 13.56 MHz.

6. The apparatus of claim 1, wherein the source electronics comprise:
    a first output stage circuit for generating a first amplified clock signal and a second amplified clock signal;
    a first transformer comprising a first primary winding, wherein the first amplified clock signal is connected to one side of the first primary winding through a series resistor R1 and series capacitor C1, and the second amplified clock signal is connected to the other side of the first primary winding through a series resistor R2 and series capacitor C2;
    a second output stage circuit for generating a third amplified clock signal and a fourth amplified clock signal; and
    a second transformer comprising a second primary winding, wherein the third amplified clock signal is connected to one side of the second primary winding through a series resistor R3 and series capacitor C3, and the fourth amplified clock signal is connected to the other side of the second primary winding through a series resistor R4 and series capacitor C4.

7. The apparatus of claim 6, wherein the source electronics further comprise an output control circuit, wherein the output control circuit,
    monitors a first current flowing through the bank A source coils,
    dynamically adjusts the first output stage circuit to maintain said first current at a prescribed constant level,
    monitors a second current flowing through the bank B source coils, and
    dynamically adjusts the second output stage circuit to maintain said second current at the prescribed constant level.

8. The apparatus of claim 6, wherein,
    C1, C2, C3 and C4 have a dynamically variable capacitance value, and
    the source electronics further comprise a first auto-tune circuit, wherein the first auto-tune circuit,
        senses a voltage V1 from an input side of R1 to circuit ground, senses a current I1 flowing through R1, and dynamically adjusts the capacitance value of C1 to maintain a near zero phase difference between V1 and I1,
        senses a voltage V2 from an input side of R2 to circuit ground, senses a current I2 flowing through R2, and dynamically adjusts the capacitance value of C2 to maintain a near zero phase difference between V2 and I2,
        senses a voltage V3 from an input side of R3 to circuit ground, senses a current I3 flowing through R3, and dynamically adjusts the capacitance value of C3 to maintain a near zero phase difference between V3 and I3, and
        senses a voltage V4 from an input side of R4 to circuit ground, senses a current I4 flowing through R4, and dynamically adjusts the capacitance value of C4 to maintain a near zero phase difference between V4 and I4.

9. The apparatus of claim 6, wherein,
    the first transformer further comprises a secondary winding A to which the bank A source coils are connected, the second transformer further comprises a secondary winding B to which the bank B source coils are connected, the source coils are each series-resonated by a dedicated series resistor and dedicated series capacitor, said capacitors each having a dynamically variable capacitance value, and the source electronics further comprise a second auto-tune circuit, wherein for each source coil the second auto-tune circuit, senses a voltage across the source coil, the dedicated series resistor and the dedicated series capacitor for the source coil, senses a current flowing through the dedicated series resistor for the source coil, and dynamically adjusts the capacitance value of the dedicated series capacitor for the source coil to maintain a negligible phase difference between the sensed voltage and the sensed current.

10. The apparatus of claim 9, wherein the dedicated series resistor for each source coil has a resistance value which is selected to maximize current flowing through the source coil, and thus maximize the strength of the flux field generated by the source coil in a near-field environment.

11. The apparatus of claim 1, wherein, the bank A source coils are alternately wound in a different direction, the bank B source coils are alternately wound in a different direction, and the flux fields generated by the bank A and bank B source coils cancel each other out in a far-field environment.

12. The apparatus of claim 1, wherein the first prescribed even number is two and the second prescribed even number is two.

13. The apparatus of claim 1, wherein the first prescribed even number is greater than two and the second prescribed even number is greater than two.

14. The apparatus of claim 1, wherein either each source coil comprises one turn, or each source coil comprises two turns.

* * * * *